March 27, 1934.     H. E. KEYES     1,952,675
APPARATUS FOR THE ABSORPTION OF GASES BY LIQUIDS
Filed Sept. 4, 1931
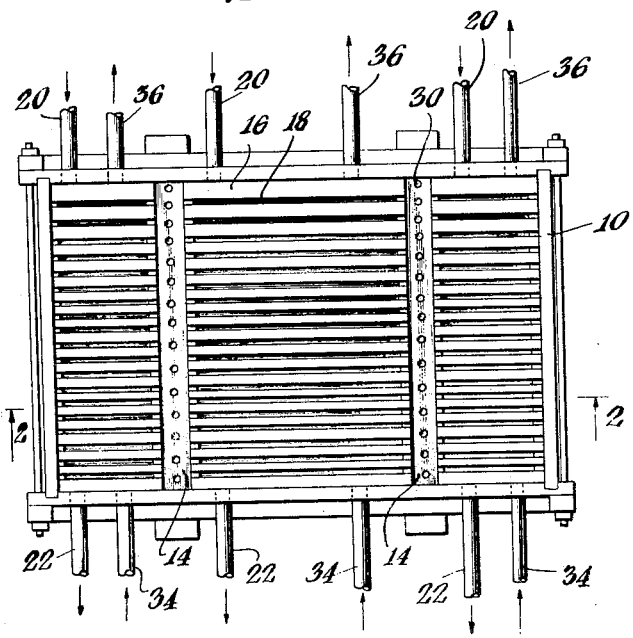
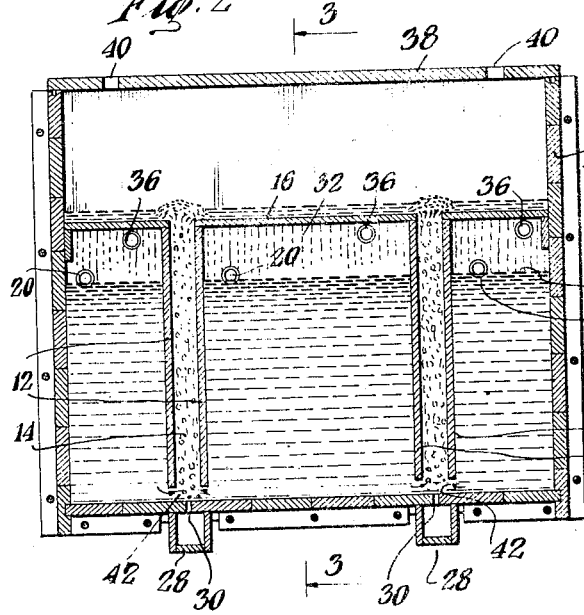 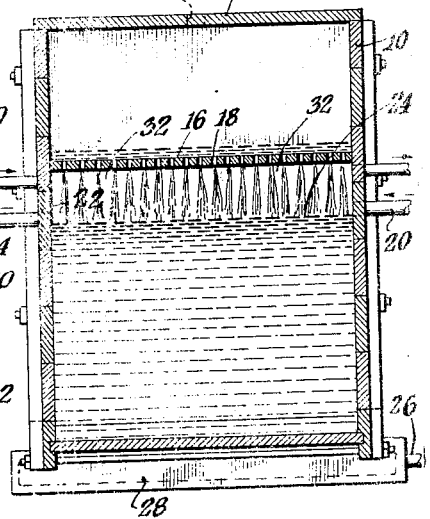
INVENTOR
Harmon E. Keyes
BY
Hoguet & Neary
ATTORNEYS Patented Mar. 27, 1934

1,952,675

UNITED STATES PATENT OFFICE 1,952,675

APPARATUS FOR THE ABSORPTION OF GASES BY LIQUIDS

Harmon E. Keyes, Miami, Ariz.

Application September 4, 1931, Serial No. 561,160

5 Claims. (Cl. 261—77)

This invention relates to improvements in apparatus for the absorption of gases by liquids. More particularly, the apparatus of my invention has definite application where a chemical reaction in a liquid is induced by the joint action of two gases, acting either simultaneously or alternately.

Heretofore, two types of gas absorption apparatus have been used in standard practice. In one case, the gas is introduced preferably as fine bubbles, by blowing it into the liquid, which exists as a continuous phase; in the other case, the solution is sprayed or trickled through an atmosphere of the gas which forms the continuous phase. In the first instance, the gas must be compressed sufficiently to overcome the hydrostatic pressure of the solution and the resistance of the apparatus, which is decidedly costly if dirty, corrosive gas is used, such as roaster gas containing sulphur dioxide, sulphur trioxide and flue dust. In the second instance, although the gas may be introduced at atmospheric pressure, yet complicated, extensive and costly apparatus is required for trickle towers or spray systems, especially in cases in which the chemical reaction is a slow one and requires a large quantity of the solution to be under treatment with the gas for a long period of time.

In the apparatus of my invention, the objections to both of the above methods are overcome. The greater part of the gas is treated at atmospheric pressure, the absorption is rapid and effective and large volumes of solution may be under treatment in a small and inexpensive container, which makes possible a cheap method of conducting a slow reaction involving large quantities of solution.

In the operation of this apparatus, one or more of the gases is absorbed by causing it to pass at substantially atmospheric pressure transversely through a cascading stream which plunges into a pool of the solution. The gas stream, which travels in a direction substantially, but not necessarily exactly, at right angles to the direction of fall of the cascade, is caught by the falling stream of liquid and carried beneath the surface of the pool, where it is absorbed. The absorption is favored by the fine dissemination of gas and by the pressure of the submerged gas bubbles which are carried beneath the surface of the solution by the cascade. The cascading stream need have only a few inches of free fall to produce effective results. The balance of the gas to be absorbed, which gas may be the same or different from the gas passing through the cascades, is injected into the apparatus under sufficient pressure to overcome the hydrostatic head of the liquid in the container and performs the double function of partial absorption and gas lift action, thus producing the necessary elevation of the liquid for the cascade action above referred to. The solution is also rapidly circulated by this means, thus subjecting it to repeated contact with the gases.

The construction of the apparatus of my invention is shown in the accompanying drawing, in which Fig. 1 is a plan of the apparatus with the cover removed. Fig. 2 is a sectional elevation taken on the line 2—2 of Fig. 1. Fig. 3 is a sectional elevation taken on the line 3—3 of Fig. 2.

In its essential features, the gas absorbing apparatus consists of a container 10, having vertical partitions 12, which form one or more gas lifts 14. A horizontal grating 16 is provided with slots 18. The container 10 may be provided with a cover 38 having vents 40. The liquid under treatment is fed into the container 10, through the pipes 20, and leaves through the pipes 22, thus maintaining the liquid level as at 24. One of the gases to be treated under sufficient pressure to overcome the hydrostatic head of the liquid is introduced through the pipes 26 by means of a blower, not shown, and passes through the header 28 and through the openings 30 into the liquid at the base of the gas lifts 14. The liquid is raised by this means and overflows on to the grating 16, and passes through the slots 18 in the form of finely divided streams into and through the gas-filled space 32. These streams or cascades impinge on the surface of the main body of the liquid. Openings 42 are provided near the lower ends of the partitions 12 so that liquid may pass from the main body into the gas lifts, thus permitting rapid circulation of the liquid through the gas lifts 14 and the gas chamber 32 and its return to the main body an indefinite number of times before passing out of the cell at 22. The balance of the gas to be treated, which gas may be the same or different from that introduced through the header 28, is introduced through pipes 34 at substantially atmospheric pressure and is drawn out of the cell through pipes 36 by means of a suction fan, not shown. This gas is thus brought into intimate contact with many streams of liquid falling through the space 32 on to the surface of the liquid.

This apparatus is particularly adapted to the production of ferric sulphate and sulphuric acid, according to the process described and claimed in my copending application Serial No. 561,159. In this case, the liquid under treatment is a solution of ferrous sulphate. The gas entering the apparatus through pipes 34 contains sulphur dioxide and the gas entering the gas lifts 14 is air or other suitable oxidizing gas.

I claim:

1. In an apparatus for absorbing gases in liquids, a tank adapted to be partially filled with a liquid, means for introducing liquid to said tank and means remotely spaced from said first-mentioned means for withdrawing liquid from said tank and for defining the normal liquid level therein, a partition dividing the space above the normal liquid level in said tank into an upper liquid-distributing chamber and a lower gas-receiving chamber, said partition being provided with openings for discharging liquid in the form of fine streams across the gas-receiving chamber upon the surface of a body of liquid in the lower portion of said tank, uplift means disposed in said tank intermediate the liquid inlet and outlet means and dividing the liquid-containing portion of said tank and the gas-receiving chamber into a plurality of compartments, said uplift means being provided with openings adjacent the bottom of the tank establishing communication with adjoining liquid-containing compartments, means for introducing gas for inducing flow of liquid from said compartments upwardly through said uplifts to said liquid-distributing chamber, and means for introducing gas to the compartments of said gas-receiving chambers and causing it to travel therethrough in a path substantially parallel to and in freely communicating relation with the surface of a body of liquid in the lower portion of said tank, and means remote from the gas inlets for withdrawing residual gas from said gas-receiving chamber.

2. In an apparatus for absorbing gases in liquids, a tank adapted to be partially filled with a liquid, means for introducing liquid to and withdrawing it from said tank and for defining the normal liquid level therein as intermediate the top and bottom of said tank, an uplift chamber communicating with said tank near the bottom thereof and projecting above the normal liquid level therein, means for injecting a gas adjacent the lower end of said uplift chamber, and causing a rapid upward movement of liquid therethrough to a point above the liquid level in said receptacle, means adjacent the upper end of said uplift for causing the liquid raised as aforesaid to fall in cascade formation upon the surface of the liquid in said tank, and means for passing a gas across the path of the cascading liquid.

3. In an apparatus for absorbing gases in liquids, a tank adapted to be partially filled with a liquid, means for introducing liquid to and withdrawing it from said tank and for defining the normal liquid level therein as intermediate the top and bottom of said tank, said tank having means at the top for defining a confined space above the normal liquid level and in free communication with the body of liquid contained in said tank, an uplift chamber communicating with said tank near the bottom thereof and projecting above the normal liquid level therein, means for injecting a gas at the bottom of said uplift chamber for setting up a rapid circulation of liquid from the lower portions of said tank, upwardly through the uplift chamber, means adjacent the upper end of said uplift chamber for causing the circulating liquid raised as aforesaid to fall in the form of cascades through said confined space upon the surface of the liquid in said tank and means for passing a gas through said confined space across the paths of said cascades.

4. In an apparatus for absorbing gases in liquids, a tank adapted to be partially filled with a liquid, means for introducing liquid to said tank and means remotely spaced from said first-mentioned means for withdrawing liquid from said tank and for defining the normal liquid level therein, a partition dividing the space above the normal liquid level in said tank into an upper liquid-distributing chamber and a lower gas-receiving chamber, said partition being provided with openings for discharging liquid in the form of fine streams across the gas-receiving chamber upon the surface of a body of liquid in the lower portion of said tank, an uplift chamber communicating with said tank near the bottom thereof and projecting above said partition, means for injecting a gas under pressure adjacent the lower end of said uplift chamber and thereby causing a rapid upward movement of liquid therethrough from the liquid-containing space in said tank to said liquid-distributing chamber, and means for introducing gas to the said gas-receiving chamber and causing it to travel therethrough in a path substantially parallel to and in freely communicating relation with the surface of a body of liquid in the liquid-containing space, and means remote from the gas inlet for withdrawing residual gas from said gas-receiving chamber.

5. In an apparatus for absorbing gases in liquids, a tank adapted to be partially filled with a liquid, means for introducing liquid to said tank and means remotely spaced from said first-mentioned means for withdrawing liquid from said tank and for defining the normal liquid level therein, a partition dividing the space above the normal liquid level in said tank into an upper liquid-distributing chamber and a lower gas-receving chamber, said partition being provided with openings for discharging liquid in the form of fine streams across the gas-receiving chamber upon the surface of a body of liquid in the lower portion of said tank, uplift means disposed in said tank and dividing the liquid-containing portion of said tank and the gas-receiving chamber into a plurality of compartments, said uplift means being provided with openings adjacent the bottom of the tank establishing communication with adjoining liquid-containing compartments, means for introducing a gas for inducing flow of liquid from said compartments upwardly through said uplifts to said liquid distributing chamber, and means for introducing gas to the compartments of said gas-receiving chambers and causing it to travel therethrough in a path substantially parallel to and in freely communicating relation with the surface of a body of liquid in the lower portion of said tank, and means remote from the gas inlets for withdrawing residual gas from said gas-receiving chamber.

HARMON E. KEYES.

Patent No. 1,952,675                                            Granted March 27, 1934

HARMON E. KEYES

The above entitled patent was extended October 2, 1951, under the provisions of the Act of June 30, 1950, for 6 years and 82 days from the expiration of the original term thereof.

*Commissioner of Patents.*